United States Patent
Seyfried et al.

(10) Patent No.: US 10,132,682 B2
(45) Date of Patent: *Nov. 20, 2018

(54) MICROSCOPE WITH AN ACOUSTO-OPTICAL DEVICE

(71) Applicant: LEICA MICROSYSTEMS CMS GMBH, Wetzlar (DE)

(72) Inventors: Volker Seyfried, Nussloch (DE); Vishnu Vardhan Krishnamachari, Seeheim-Jugenheim (DE)

(73) Assignee: Leica Microsystems CMS GmbH, Wetzlar (DE)

( * ) Notice: Subject to any disclaimer, the term of this patent is extended or adjusted under 35 U.S.C. 154(b) by 166 days.

This patent is subject to a terminal disclaimer.

(21) Appl. No.: 14/916,528

(22) PCT Filed: Sep. 3, 2014

(86) PCT No.: PCT/EP2014/068750
§ 371 (c)(1),
(2) Date: Mar. 3, 2016

(87) PCT Pub. No.: WO2015/032822
PCT Pub. Date: Mar. 12, 2015

(65) Prior Publication Data
US 2016/0202121 A1    Jul. 14, 2016

(30) Foreign Application Priority Data

Sep. 3, 2013    (DE) .................. 10 2013 217 495
Dec. 23, 2013    (DE) .................. 10 2013 227 103

(51) Int. Cl.
*G01J 3/12*    (2006.01)
*G02F 1/33*    (2006.01)
(Continued)

(52) U.S. Cl.
CPC ........ *G01J 3/1256* (2013.01); *G02B 21/0032* (2013.01); *G02B 21/0064* (2013.01);
(Continued)

(58) Field of Classification Search
CPC ... G02F 1/11; G02F 1/33; G02F 1/116; G02F 1/01; G02B 21/0032; G02B 21/0064; G02B 21/0076; G02B 27/106; G01J 3/1256
See application file for complete search history.

(56) References Cited

U.S. PATENT DOCUMENTS

| | | | | | |
|---|---|---|---|---|---|
| 5,216,484 | A | * | 6/1993 | Chao ..................... | G01J 3/1256 250/339.07 |
| 5,504,619 | A | * | 4/1996 | Okazaki .................. | B41B 19/00 359/489.07 |

(Continued)

FOREIGN PATENT DOCUMENTS

| | | |
|---|---|---|
| DE | 19906757 A1 | 12/1999 |
| DE | 102010033722 A1 | 2/2012 |
| WO | WO 00/39545   * | 7/2000 |

OTHER PUBLICATIONS

Thomas J Fellers: "Olympus Fluoview Resource Center: Acousto-Optic Tunable Filters", Mar. 19, 2013, https://web.archive.org/web/20130319085942/http://www.olympusconfocal.com/theory/aotfintro.html.

*Primary Examiner* — Helen Kwok
(74) *Attorney, Agent, or Firm* — Hodgson Russ LLP

(57) ABSTRACT

The invention relates to a microscope having an acousto-optic apparatus (13) that, with a mechanical wave that is characterized by a preferably adjustable frequency, removes from a polychromatic and collinear detected light bundle (18) portions of illuminated light, scattered and/or reflected at a sample, having an illuminating light wavelength associated with the frequency. The microscope is notable for the (Continued)

fact that a crystal (30) of the acousto-optic apparatus in which the mechanical wave propagates, and the propagation direction of the mechanical wave, are oriented relative to the detected light bundle incident into the crystal in such a way that the acousto-optic apparatus deflects, with the mechanical wave, both the portion of the detected light bundle having the illuminating wavelength and a first linear polarization direction, and the portion of the detected light bundle having the illuminating wavelength and a second linear polarization direction perpendicular to the first polarization direction, and thereby removes them from the detected light bundle.

17 Claims, 2 Drawing Sheets

(51) Int. Cl.
  *G02B 21/00* (2006.01)
  *G02B 27/10* (2006.01)
  *G02F 1/11* (2006.01)
(52) U.S. Cl.
  CPC ..... *G02B 21/0076* (2013.01); *G02B 27/1006* (2013.01); *G02F 1/116* (2013.01)

(56) References Cited

U.S. PATENT DOCUMENTS

| | | | |
|---|---|---|---|
| 5,599,717 A * | 2/1997 | Vo-Dinh | A61B 5/0059 436/171 |
| 5,796,512 A * | 8/1998 | Wachman | G01J 3/2823 250/339.02 |
| 6,525,812 B1 * | 2/2003 | Hartmann | G02B 21/002 356/318 |
| 6,737,635 B2 * | 5/2004 | Engelhardt | G02B 21/0032 250/225 |
| 6,967,764 B2 | 11/2005 | Birk | |
| 8,064,121 B2 * | 11/2011 | Seyfried | G02F 1/116 359/285 |
| 8,755,116 B2 * | 6/2014 | Kastrup | G02B 21/0076 359/489.01 |
| 2003/0107732 A1 * | 6/2003 | Sasaki | G01N 21/6458 356/318 |
| 2004/0174585 A1 * | 9/2004 | Birk | G02B 21/0024 359/305 |
| 2009/0021749 A1 * | 1/2009 | Yeo | G01N 21/9501 356/601 |
| 2011/0158502 A1 * | 6/2011 | Meshulach | G01N 21/9501 382/145 |
| 2011/0304900 A1 * | 12/2011 | Widzgowski | G02F 1/113 359/287 |
| 2016/0209270 A1 * | 7/2016 | Seyfried | G01J 3/1256 |
| 2016/0216498 A1 * | 7/2016 | Seyfried | G02B 21/0032 |
| 2016/0223882 A1 * | 8/2016 | Krishnamachari | G01J 3/1256 |

* cited by examiner

MICROSCOPE WITH AN ACOUSTO-OPTICAL DEVICE

The invention relates to a microscope having an acousto-optic apparatus that, with a mechanical wave that is characterized by a preferably adjustable frequency, removes from a polychromatic and collinear detected light bundle portions of illuminated light, scattered and/or reflected at a sample, having an illuminating light wavelength associated with the frequency.

Such a microscope can be embodied, for example, as a scanning microscope and in particular as a confocal scanning microscope.

In scanning microscopy, a sample is illuminated with a light beam in order to observe the reflected or fluorescent light emitted from the sample. The focus of an illuminating light beam is moved in a specimen plane with the aid of a controllable beam deflection device, generally by tilting two mirrors; the deflection axes are usually perpendicular to one another, so that one mirror deflects in an X direction and the other in a Y direction. Tilting of the mirrors is brought about, for example, with the aid of galvanometer positioning elements. The power level of the light coming from the specimen is measured as a function of the position of the scanning beam. The positioning elements are usually equipped with sensors for ascertaining the current mirror position.

In confocal scanning microscopy in particular, a specimen is scanned in three dimensions with the focus of a light beam. A confocal scanning microscope generally encompasses a light source, a focusing optical system with which the light of the source is focused onto an aperture (called the "excitation pinhole"), a beam splitter, a beam deflection device for beam control, a microscope optical system, a detection pinhole, and the detectors for detecting the detected light or fluorescent light. The illuminating light is coupled in, for example, via a beam splitter.

The fluorescent light coming from the specimen travels via the beam deflection device back to the beam splitter, passes through the latter, and is then focused onto the detection pinhole behind which the detectors are located. Detected light that does not derive directly from the focus region takes a different light path and does not pass through the detection pinhole, so that a spot information item is obtained which results, by sequential scanning of the specimen, in a three-dimensional image.

In fluorescence microscopy the portions of illuminating light reflected at the sample and scattered at the sample must be removed from the detected light so that exclusively the fluorescent light can be detected. In a conventional microscope a dichroic filter, constituting a so-called "main beam splitter," is used for this purpose.

Instead of such a beam splitter, an optical arrangement configured as an acousto-optic component can also be provided in order to couple the excitation light of at least one light source into the microscope and to block the excitation light or excitation wavelength, scattered and reflected at the specimen, out of the light coming from the specimen via the detection beam path; this is known, for example, from German Application DE 199 06 757 A1. The optical arrangement known from this document is characterized, for variable configuration with a very simple design, in that excitation light having a different wavelength can be blocked out by the spectrally selective element. Alternatively, an optical arrangement of this kind is characterized in that the spectrally selective element is adjustable to the excitation wavelength that is to be blocked out.

The manner of operation of an acousto-optic component of this kind is based substantially on the interaction of the illuminating light with a mechanical wave; with some acousto-optic components, for example an AOTF, the mechanical wave must have a very specific frequency so that the Bragg condition is exactly satisfied for the light having the desired illuminating light wavelength. With these acousto-optic components, light for which the Bragg condition is not satisfied is not deflected by the mechanical wave. If light having multiple wavelengths is to be used as illuminating light for illumination of the sample, multiple different mechanical waves must therefore also be generated simultaneously.

Acousto-optic components are generally made up of a so-called acousto-optic crystal, on which is mounted an electrical converter (often referred to in the literature as a "transducer"). The converter usually encompasses a piezoelectric material as well as one electrode located above it and one located below it. Electrical activation of the electrodes with radio frequencies, which are typically in the region between 30 MHz and 800 MHz, causes the piezoelectric material to vibrate, so that an acoustic wave (i.e. a sound wave) can occur and, once produced, passes through the crystal. After passing through an optical interaction region, the acoustic wave is usually absorbed or reflected away at the oppositely located side of the crystal.

Acousto-optic crystals are notable for the fact that the resulting sound wave modifies the optical properties of the crystal, a kind of optical grating or comparable optically active structure, for example a hologram, being induced by the sound. Light passing through the crystal experiences a diffraction at the optical grating. The light is correspondingly directed into various diffraction orders in diffraction directions. There are acousto-optic components that influence all of the incident light more or less irrespective of wavelength. Reference may be made, solely by way of example, to components such as acousto-optic modulators (AOMs), acousto-optic deflectors (AODs), or frequency shifters. Components moreover also already exist that, for example, act selectively on individual wavelengths as a function of the irradiated radio frequency (acousto-optic tunable filters, AOTFs). The acousto-optic elements are often made of birefringent crystals, for example tellurium oxide; the optical effect of the respective element is determined in particular by the location of the crystal axis relative to the incidence direction of the light and its polarization. These correlations are known, for example, from DE 10 2006 053 187 A1.

The manner of operation of a scanning microscope that comprises an acousto-optic component as a main beam splitter is described in detail in DE 101 37 155 A1. Also described therein is the fact that the mechanical wave, deflecting the tangentially polarized illuminating light, of a first AOTF can completely remove from the detected light exclusively those portions having the illuminating light wavelength and having a tangential linear polarization direction. The detected light comprises, however, portions having both a sagittal polarization direction and a tangential polarization direction.

The acousto-optic component is therefore followed by a compensation element that is embodied as a further acousto-optic component. The further acousto-optic component is likewise embodied as an AOTF and has control applied to it by a further high-frequency source using a further electromagnetic high-frequency wave having another frequency. The HF frequency of the further electromagnetic high-frequency wave is selected so that those portions of the detected light which have the wavelength of the illuminating light and a sagittal polarization direction are blocked out. This procedure is necessary because for the light having a sagittal polarization direction which is to be blocked out of the detected light, the Bragg condition for diffraction at a mechanical wave is satisfied only if the mechanical wave has a frequency other than the one for the light having a tangential polarization direction. The microscope must thus furnish, for each illuminating light wavelength, two different HF frequencies for simultaneous generation of two mechanical waves having different frequencies. A further acousto-optic component having a further acoustic generator is furthermore obligatorily necessary. If illumination using illuminating light having four wavelengths is to be effected, for example, fluorescent light detection is possible only if eight electromagnetic high-frequency waves are simultaneously furnished and if eight mechanical waves having different frequencies, distributed over two acousto-optic components, are generated therefrom.

The object of the present invention is therefore to describe a microscope, having an acousto-optic component, that permits flexible fluorescent light detection with less complexity.

The object is achieved by a microscope of the kind recited previously which is characterized in that a crystal of the acousto-optic apparatus in which the mechanical wave propagates, and the propagation direction of the mechanical wave, are oriented relative to one another and relative to the detected light bundle incident into the crystal in such a way that the acousto-optic apparatus deflects, with the mechanical wave, both the portion of the detected light bundle having the illuminating wavelength and a first linear polarization direction, and the portion of the detected light bundle having the illuminating wavelength and a second linear polarization direction perpendicular to the first polarization direction, and thereby removes them from the detected light bundle.

What has been recognized according to the present invention is firstly that the incoupling of two mechanical waves for each illuminating light wavelength causes a particularly high thermal power level to be introduced into the crystal or crystals, which ultimately reduces diffraction efficiency. In addition, the unavoidable temperature fluctuations also cause the deflection directions and light power levels to fluctuate.

It has also been found in practice that obtrusive stripes often occur in the image of a scanning microscope. It has been recognized according to the present invention, in this regard, that a "beat" can occur when the wavelengths of the requisite acoustic waves overlap, which ultimately results in periodic fluctuations of the illuminating light power level when illuminating light is also directed into an illumination beam path via the acousto-optic component.

It has also been recognized according to the present invention that the crystal, the mechanical wave, and the detected light bundle incident into the crystal can be oriented with respect to one another in such a way that a simultaneous deflection of detected light having the same wavelength, but a different linear polarization direction, is possible with one and the same mechanical wave. The deflection occurs irrespective of the linear polarization direction in different directions, but this plays no part with regard to the microscope according to the present invention, since in any case only the remaining detected light is to be detected and the portion removed from the detected light is not utilized further.

The invention has the advantage that for each illuminating light wavelength used, only a single HF frequency is necessary in order to generate a single mechanical wave for removal of the undesired illuminating light reflected or scattered at the sample, whereas two HF frequencies, namely one for the one polarization direction and one for the other polarization direction, were hitherto necessary.

The invention has the further advantage that as compared with microscopes known from the existing art having the same HF generator, twice as many illuminating light wavelengths can be removed from the detected light; and, as will be explained in detail below, the possibility is also created of directing into an illumination beam path illuminating light having twice as many wavelengths.

The HF generators of commercially usual acousto-optic components usually comprise no more than eight channels, so that with the microscope according to the present invention it becomes possible to remove illuminating light having eight wavelengths (rather than hitherto only four wavelengths) from the detected light coming from the sample. In a particular embodiment, the incoupling of illuminating light having eight (rather than hitherto four) wavelengths into an illumination beam path can be accomplished simultaneously using the same mechanical waves.

A further advantage of the microscope according to the present invention is that the above-described thermal input into the crystal is halved, and the problem of occasionally occurring beats is entirely avoided. The microscope according to the present invention has in this regard the advantage that the risk of temperature-related fluctuations in light power level is at least decreased, and the aforementioned problem of stripes in the image is entirely eliminated.

In a particular embodiment of the microscope, provision is made that the first linear polarization direction is the linear polarization direction of the ordinary light with respect to a birefringence property of the crystal; and/or that the second linear polarization direction is the linear polarization direction of the extraordinary light with respect to a birefringence property of the crystal. Alternatively or additionally, provision can also be made that the first or the second linear polarization direction is arranged in the plane that is spanned by the propagation direction of the mechanical wave and the propagation direction of the detected light bundle.

In a very particularly advantageous embodiment, provision is made that the remaining part of the detected light bundle leaves the crystal collinearly. This can be achieved, for example, by way of a suitable angular orientation of the entrance surface through which the detected light bundle enters the crystal, and a suitable angular orientation of the exit surface through which the detected light bundle leaves the crystal. It is also possible, alternatively or additionally, to achieve collinearity of the remaining part of the detected light bundle with the aid of an additional, dispersive optical component, as described below in more detail.

In a particularly advantageous embodiment of a microscope according to the present invention, with the mechanical wave the acousto-optic apparatus divides off, from at least one polychromatic and preferably collinear primary light bundle, illuminating light having an illuminating light wavelength associated with the frequency of the mechanical wave, and directs it into an illumination beam path for illumination of a sample.

The primary light can derive from a single light source. Provision can also be made, however, that the primary light derives from multiple light sources. Provision can be made in particular that the primary light beam bundle combines different light sources into one collinear primary bundle.

Provision can be made in particular that the light source is embodied as a broad-band white light source. Such a light source can comprise in particular a special optical element, for example a microstructured optical element and/or a tapered filter and/or a photonic crystal fiber and/or a photonic crystal and/or a photonic band gap material and/or a comparable optical element inducing nonlinearities, which spectrally broadens the incident primary light, in particular the light of a pulsed laser. A light source of this kind can make available primary light having a spectral width of several 100s of nm, so that with the aid of the acousto-optic component the user can individually select from this broad spectrum exactly the illuminating light having the wavelength or wavelengths that he or she needs for his or her experiment.

Provision can advantageously be made in particular that the unpolarized light of a white light source of this kind is divided into two portions whose linear polarization directions are perpendicular to one another. Advantageously, the one portion can be coupled in oppositely to the direction of the first diffraction order of the ordinary light (with respect to the diffracted portion of the detected light), while the other portion can be coupled in oppositely to the direction of the second diffraction order of the extraordinary light (with respect to the diffracted portion of the detected light). The illuminating light diffracted out of the two portions thus proceeds collinearly.

All the primary light of the white light source is thus available so that from that primary light, illuminating light having a specific wavelength or specific wavelengths can be directed with the aid of the acousto-optic apparatus into the illumination beam path of the microscope and thus to the sample. This has the particular advantage, as compared with acousto-optic main beam splitters known from the existing art, that all of the primary light of such a light source can be utilized. The same is of course also true of other light sources that emit unpolarized light.

In addition to a white light source of this kind, multiple further light sources, whose primary light bundles are combined with the primary light bundle of the white light source, can be present.

According to an independent inventive idea, provision is made in a very particularly advantageous embodiment that with the mechanical wave the acousto-optic apparatus respectively divides off, both from a first polychromatic and preferably collinear primary light bundle having a first linear polarization direction and from a second polychromatic and preferably collinear primary light bundle having a second linear polarization direction perpendicular to the first linear polarization direction, illuminating light having the illuminating light wavelength associated with the frequency of the mechanical wave, and directs it into an illumination beam path for illumination of a sample. It is thus possible, with a single mechanical wave, to respectively select from the two primary light bundles having different linear polarization directions exactly the portion having the one desired illuminating light wavelength, and to use it for illumination of a sample.

This embodiment has the very particular advantage that all of the primary light of a light source, for example the primary light of a white light source having a microstructured element (which, unlike e.g. a laser, emits unpolarized light) can be used. This is achieved according to the present invention in that the unpolarized primary light is divided, for example with the aid of a polarizing beam splitter, into the first and the second primary light bundle, and then the two primary light bundles are coupled (as a rule at different incoupling sites and/or at different incidence angles) into the acousto-optic apparatus, in particular into the crystal. This is done preferably in such a way that the portions of the primary light bundles selected for illumination of the sample, having the desired illuminating light wavelength, are divided off by the same mechanical wave and directed into the preferably common illumination beam path for illumination of a sample.

The microscope according to the present invention thus has the advantage, as compared with microscopes known from the existing art, that even unpolarized primary light can be used without losing half the light power level.

The microscope according to the present invention can of course also be configured in such a way that, as already indicated at several points, multiple mechanical waves are used simultaneously to remove illuminating light having multiple different wavelengths from the detected light, and/or to direct illuminating light having multiple different wavelengths into the illumination beam path, although advantageously only a single mechanical wave is generated in the crystal for each illuminating light wavelength. This is described in detail below.

Provision is thus made, in a particular embodiment, that the acousto-optic apparatus removes from the detected light bundle, with multiple mechanical waves that are each characterized by different frequencies, portions of illuminating light that is scattered and/or reflected at a sample and has multiple illuminating light wavelengths, one of the illuminating light wavelengths being associated with each frequency; and each of the mechanical waves respectively deflecting both the portion, having the illuminating light wavelength associated with its frequency, having a first linear polarization direction and the portion having a second linear polarization direction perpendicular to the first linear polarization direction, and thereby removing them from the detected light bundle.

Provision can be made here in particular that the mechanical waves have the same propagation direction and/or are generated by the same acoustic generator. The acoustic generator is preferably mounted on an outer surface of the crystal, the propagation direction of the mechanical wave relative to the crystal and its lattice structure being determined by the orientation of that outer surface relative to the crystal body, which is definable by the crystal cut.

Provision can advantageously also be made that with the multiple mechanical waves the acousto-optic apparatus divides off, from polychromatic primary light of at least one light source, illuminating light having multiple illuminating light wavelengths and directs it into an illumination beam path for illumination of a sample. Provision can be made in particular that with the multiple mechanical waves the acousto-optic apparatus divides off, from a polychromatic and preferably collinear primary light bundle, illuminating light of multiple illuminating light wavelengths for illumination of the sample and directs it into an illumination beam path for illumination of a sample.

As already described above with reference to a mechanical wave, provision can advantageously be made that with the multiple mechanical waves the acousto-optic apparatus respectively divides off, both from a first polychromatic and preferably collinear primary light bundle having a first linear polarization direction, and from a second polychromatic and preferably collinear primary light bundle having a second linear polarization direction perpendicular to the first linear polarization direction, illuminating light having several wavelengths, and directs it into an illumination beam path for illumination of a sample, the respective frequency of the respective mechanical wave being associated (in particular in order to satisfy the respective Bragg condition), for both polarization directions of the portion to be divided off, with one of the illuminating light wavelengths.

As already mentioned, provision can advantageously be made that the first primary light bundle and the second primary light bundle have different polarization directions; and/or that the first primary light bundle and the second primary light bundle have been produced by spatial division of a primary primary light bundle, for example with the aid of a polarizing beam splitter.

Provision can advantageously be made in particular that the first primary light bundle and the second primary light bundle have been produced by spatial division of an unpolarized primary primary light bundle, for example of a white light source, using a polarizing beam splitter.

As already mentioned, provision can advantageously be made that the first primary light bundle has the same linear polarization direction as the ordinary light diffracted by the mechanical wave into the first order, while the second primary light bundle has the same linear polarization direction as the extraordinary light diffracted by the mechanical wave into the second diffraction order. The result thereby achieved is that both the first primary light bundle and the second primary light bundle can be coupled simultaneously into the acousto-optic apparatus, and that illuminating light having the desired illuminating light wavelength associated with the frequency of the mechanical wave can be deflected out of both primary light bundles, with one mechanical wave for both polarization directions, into an illumination beam path.

As also already explained, the light from both primary light bundles that has the desired wavelengths can also be respectively directed into the illumination beam path with the aid of multiple mechanical waves. It is advantageous in any case that only a single mechanical wave is required for each illuminating light wavelength.

In a very particularly advantageous embodiment the divided-off illuminating light leaves the acousto-optic apparatus and/or the crystal as a collinear illuminating light bundle. This embodiment has the advantage that the illuminating light can be focused onto or into the sample with a single objective and preferably with illumination of the entire objective pupil.

In a particular embodiment the crystal comprises an entrance surface for the detected light; provision can be made in particular that the detected light is incident at an incidence angle of zero degrees. Provision can also be made in particular that the crystal comprises an exit surface for the detected light, through which the detected light leaves the crystal preferably at a return angle of zero degrees.

In a particular embodiment the crystal comprises an entrance surface and an exit surface, oriented parallel thereto, for the detected light.

In a very particularly advantageous embodiment, the crystal comprises at least one entrance surface for the primary light of at least one light source. As already explained, the light source can advantageously be a light source that emits primary light having a broad spectrum, for example with the aid of a microstructured fiber and/or a PBG fiber, so that the respective light portions having the desired wavelengths can be directed into the illumination beam path of the microscope with the aid of the acousto-optic apparatus. The deflection of the desired illuminating light is preferably accomplished by diffraction at the mechanical wave (or mechanical waves, if light of multiple wavelengths is desired as illuminating light) into the first diffraction order, while the remaining light, with no interaction with the mechanical wave (or waves), travels to a beam trap.

In a very particularly advantageous embodiment provision is made that the crystal comprises at least one entrance surface for the primary light of at least one light source, which at the same time is the exit surface for the detected light.

Provision can also be made in particular that the crystal comprises an exit surface for the illuminating light which at the same time is the entrance surface for the detected light; and/or that the crystal comprises an entrance surface for primary light of at least one light source and an exit surface for the divided-off illuminating light, which are oriented with respect to one another in such a way that the illuminating light deflected with the mechanical wave encounters the exit surface at an incidence angle of zero degrees.

A particularly advantageous embodiment is one in which the crystal comprises an entrance surface for primary light of at least one light source and an exit surface for the divided-off illuminating light, which are oriented with respect to one another in such a way that the primary light is couplable into the crystal as a collinear primary light bundle, and the illuminating light deflected with the mechanical wave leaves the crystal as a collinear illuminating light bundle.

In order to achieve collinearity of the relevant light bundles, in an advantageous embodiment provision is made that the acousto-optic apparatus comprises at least one dispersive optical component that compensates for a spatial color division, produced (at least in part) by the crystal, of the primary light and/or of the illuminating light and/or of the detected light.

Alternatively or additionally, provision can also be made that the acousto-optic apparatus comprises at least one dispersive optical component that compensates for a spatial color division, produced (at least in part) by the crystal, of the primary light and/or of the illuminating light and/or of the detected light, and that has multiple entrance surfaces: in particular a first entrance surface for light having a first linear polarization direction and a second entrance surface for light having a second linear polarization direction perpendicular to the first linear polarization direction.

These embodiments have the particular advantage that the acousto-optic apparatus can be equipped with a crystal that can have a comparatively simple basic shape. Provision can be made, for example, that the entrance surface for the detected light is embodied to be parallel to the exit surface for the detected light. According to the present invention a spatial color division, by the crystal, of the primary light of a light source coupled in, for example, through the exit surface for the detected light can be compensated for, for example, by the fact that before the primary light encounters the crystal it is first spatially divided in an opposite direction, and that spatial division is undone again by the crystal.

Particularly advantageously, the microscope can be embodied, for example, as a scanning microscope, in particular as a confocal scanning microscope.

As already mentioned, the acousto-optic apparatus according to the present invention can be embodied in particular as an acousto-optic main beam splitter for a microscope according to the present invention.

Provision can be made in particular that the acousto-optic apparatus is embodied as an acousto-optic tunable filter (AOTF) and/or comprises at least one AOTF.

The configuration of the acousto-optic apparatus, in particular the orientation of the crystal, of the propagation direction of the mechanical wave(s) and of the propagation direction of the detected light bundle with respect to one another, and the orientation of the entrance and exit surfaces with respect to one another and to the optical axis of the crystal, can be developed, for example—in particular for an embodiment in which the divided-off illuminating light leaves the acousto-optic apparatus and/or the crystal as a collinear illuminating light bundle—in accordance with the iterative method discussed below; preferably the method is pursued not on the basis of real components (although that would also be possible) but instead in a computer simulation, until the individual parameters of crystal shape, orientation of the surfaces and of the crystal lattice, orientation of the propagation direction of the mechanical wave(s), and propagation directions of the detected light and/or illuminating light, conform to the desired requirements. When all the relevant parameters have been ascertained in this manner in a computer simulation, the crystal can then be manufactured in a further step.

Firstly an acousto-optic component having a known, commercially usual crystal cut and a known orientation is introduced into the beam path of a microscope in such a way that the detected light bundle encounters the entrance surface of the crystal at an incidence angle of 90 degrees. The crystal is then rotated, preferably in the plane that is spanned by the incident detected light bundle and the propagation direction of the mechanical wave, and the angle between the propagation direction of the mechanical wave and the crystal axes is thus also modified, until both linear polarization portions of the illuminating light wavelength(s) are deflected, with the mechanical wave(s), out of the detected light bundle and are thereby removed from the detected light bundle.

The result of the rotation is generally, however, that the collinearity of the emerging detected light is lost. For this reason, in a next iteration step the shape of the crystal is modified—without rotating the crystal—in such way that the entrance surface is once again perpendicular to the incident detected light bundle. In a further step, the exit surface for the detected light is oriented—without rotating the crystal but by modifying the crystal shape—so that the detected light leaves the crystal as a collinear detected light bundle.

The result of the changes in the crystal shape is generally, however, that both linear polarization portions of the illuminating light wavelength(s) can no longer each be deflected with the mechanical wave and thereby removed from the detected light bundle. For this reason, the crystal is then rotated again until this condition is again satisfied. The further iteration steps already described are then repeated.

A sufficient number of iteration cycles are carried out until the condition of simultaneous deflection of both linear polarization portions, and the condition of collinear light exit, are satisfied. As a rule the method converges very quickly, so that the goal is reached after a few iteration cycles.

In a particular embodiment, care is respectively taken upon rotation of the crystal that with respect to one of the linear polarization directions of the detected light, all of the light that is diffracted into the first order, and that has the illuminating light wavelengths, exits the crystal collinearly. Such an embodiment has the advantage not only that both portions having a different linear polarization can respectively be removed from the detected light bundle with a single mechanical wave, but also that multi-colored illuminating light can additionally be diffracted collinearly into the illuminating light beam path via the light path of the first diffraction order, for which the above-described collinearity exists.

The subject matter of the invention is schematically depicted in the drawings and will be described below with reference to the Figures, identically functioning elements being labeled with the same reference characters. In the drawings:

FIG. 1 shows an exemplifying embodiment, embodied as a confocal scanning microscope, of a microscope according to the present invention.

Figure 1:
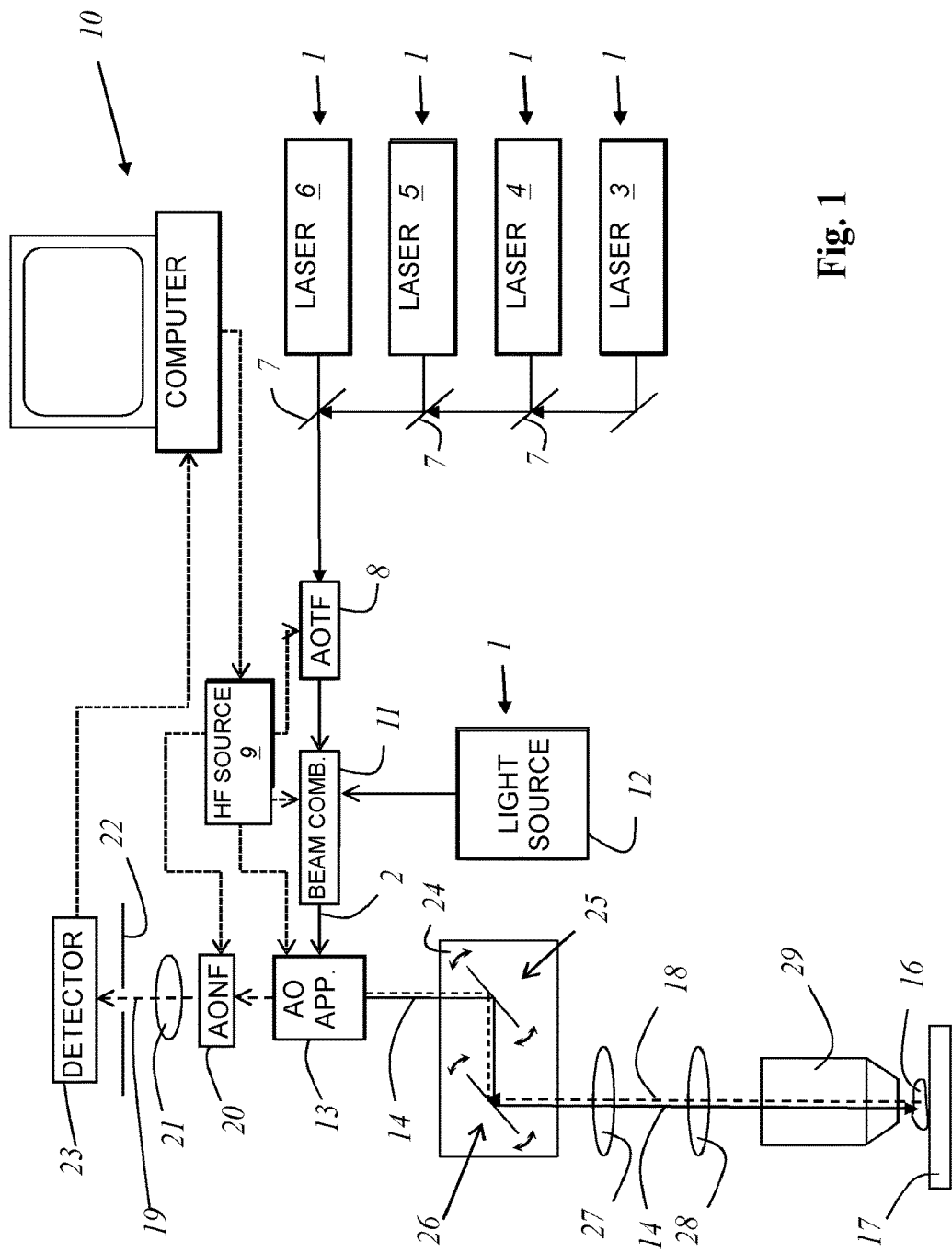
FIG. 1 shows an exemplifying embodiment of a microscope according to the present invention.

The microscope contains multiple light sources 1 whose light is combined into one collinear primary light bundle 2. Specifically, the microscope contains a diode laser 3, a (preferably diode-pumped) solid state laser 4 (DPSS laser), a helium-neon laser 5, and an argon ion laser 6, whose emitted light bundles are combined with the aid of dichroic beam splitters 7. The combined emitted light bundles then travel to an acousto-optic tunable filter (AOTF) 8 that allows light of specific wavelengths to be selected from the combined emitted light bundle and passed on. AOTF 8 is impinged upon for this purpose by electromagnetic high-frequency waves of a high-frequency source 9; the user can define, by input via a PC 10, which wavelength or wavelengths the passed-on light is to have, and the frequency of high-frequency source 9 is automatically adjusted accordingly by the microscope. Mechanical waves for diffracting the desired light are generated inside AOTF 8 with the aid of the electromagnetic high-frequency waves.

The microscope furthermore has an acousto-optic beam combiner 11 that receives on the one hand light passed on from AOTF 8, and on the other hand the light of a white light source 12.

A white light source 12 of this kind can comprise in particular a special optical element, for example a microstructured optical element and/or a tapered fiber and/or a photonic crystal fiber and/or a photonic crystal and/or a photonic band gap material and/or a comparable optical element inducing nonlinearities, which spectrally broadens the incident primary light, in particular the light of a pulsed laser. A light source of this kind can make available primary light having a spectral width of several 10s of nm, in particular several 100s of nm.

Acousto-optic beam combiner 11 is likewise impinged upon by electromagnetic high-frequency waves that are furnished by high-frequency source 9. Acousto-optic beam combiner 11 contains an acousto-optic element in which mechanical waves for deflecting or diffracting light rays can be generated with the electromagnetic high-frequency waves, in such a way that the light passed on from AOTF 8 and the light of white light source 12 leave acousto-optic beam combiner 11 collinearly with one another as a combined primary light bundle.

The microscope furthermore contains an acousto-optic apparatus 13 that functions as a main beam splitter. Acousto-optic apparatus 13 has in this regard on the one hand the task of directing illuminating light 14 having a desired wavelength, or illuminating light 14 having multiple desired wavelengths, into an illuminating light beam path 15, and on the other hand the task of removing, from the polychromatic and collinear detected light bundle 18 (shown with dashed lines) emerging from the illuminated sample 16 that is arranged on a specimen stage 17, the portions of illuminating light 15 scattered and/or reflected at sample 16.

Illuminating light 14 directed from acousto-optic apparatus 13 into illumination beam path 15 travels to a beam deflection device 24 that contains a first galvanometer mirror 25 and a second galvanometer mirror 26. The remaining part of primary light 2 is not influenced by the mechanical wave or waves, and travels into beam traps (not depicted).

After leaving beam deflection device 24, illuminating light 14 travels to scanning lens 27, then to tube lens 28 and lastly to an objective 29 that focuses illuminating light 14 onto or into sample 16.

Beam deflection device 24 guides the focus of illuminating light 14 preferably in a meander shape over or through sample 16. Galvanometer mirror 25 is responsible for deflection in an X direction, while second galvanometer mirror 26 is responsible for deflection in a Y direction.

Acousto-optic apparatus 13 is also impinged upon by at least one electromagnetic high-frequency wave in order to generate at least one mechanical wave having one frequency. The frequency of the mechanical wave can be modified by modifying the frequency of the electromagnetic high-frequency wave. The mechanical wave can be generated, for example, with the aid of a piezo acoustic generator.

A crystal (not depicted in this Figure) of acousto-optic apparatus 13 in which the mechanical wave propagates, and the propagation direction of the mechanical wave, are oriented with respect to detected light bundle 18 coming from sample 16 in such a way that acousto-optic apparatus 13 deflects, with the mechanical wave, both the portion of detected light bundle 18 having the illuminating wavelength and a first linear polarization direction, and the portion of detected light bundle 18 having the illuminating wavelength and a second linear polarization direction perpendicular to the first polarization direction, and thereby removes them from detected light bundle 18. Remaining portion 19 of detected light bundle 18 leaves the crystal collinearly and, after passing through an acousto-optic notch filter (AONF) 20, an imaging optical system 21, and a detection pinhole 22, arrives at a detector 23 that is preferably embodied as a multi-band detector. The electrical signals of detector 23 are transferred to PC 10 for further processing and evaluation.

The microscope is configured in such a way that not only can light having one wavelength be directed as illuminating light 14 into illuminating light beam path 15, and not only can light having one wavelength be removed from detected light bundle 18 coming from sample 16, but instead multiple mechanical waves can be used simultaneously to remove illuminating light having multiple different wavelengths (and both linear polarization directions) from the detected light and/or to direct illuminating light having multiple different wavelengths (and both linear polarization directions) into the illuminating light beam path, although advantageously only a single mechanical wave is generated for each illuminating light wavelength in the crystal of acousto-optic apparatus 13.

Acousto-optic apparatus 13 is impinged upon, for each illuminating light wavelength desired by the user, by a separate electromagnetic high-frequency wave that is generated by high-frequency source 9. For the sake of completeness, it should be mentioned that the different high-frequency waves that high-frequency source 9 furnishes for AONF 20, for acousto-optic beam combiner 11, for AOTF 8, and for acousto-optic apparatus 13 as a rule have different frequencies. It is also possible, however, to embody the acousto-optic components in such a way that two high-frequency waves having the same frequency can be used for at least of two acousto-optic components.

Figure 2:
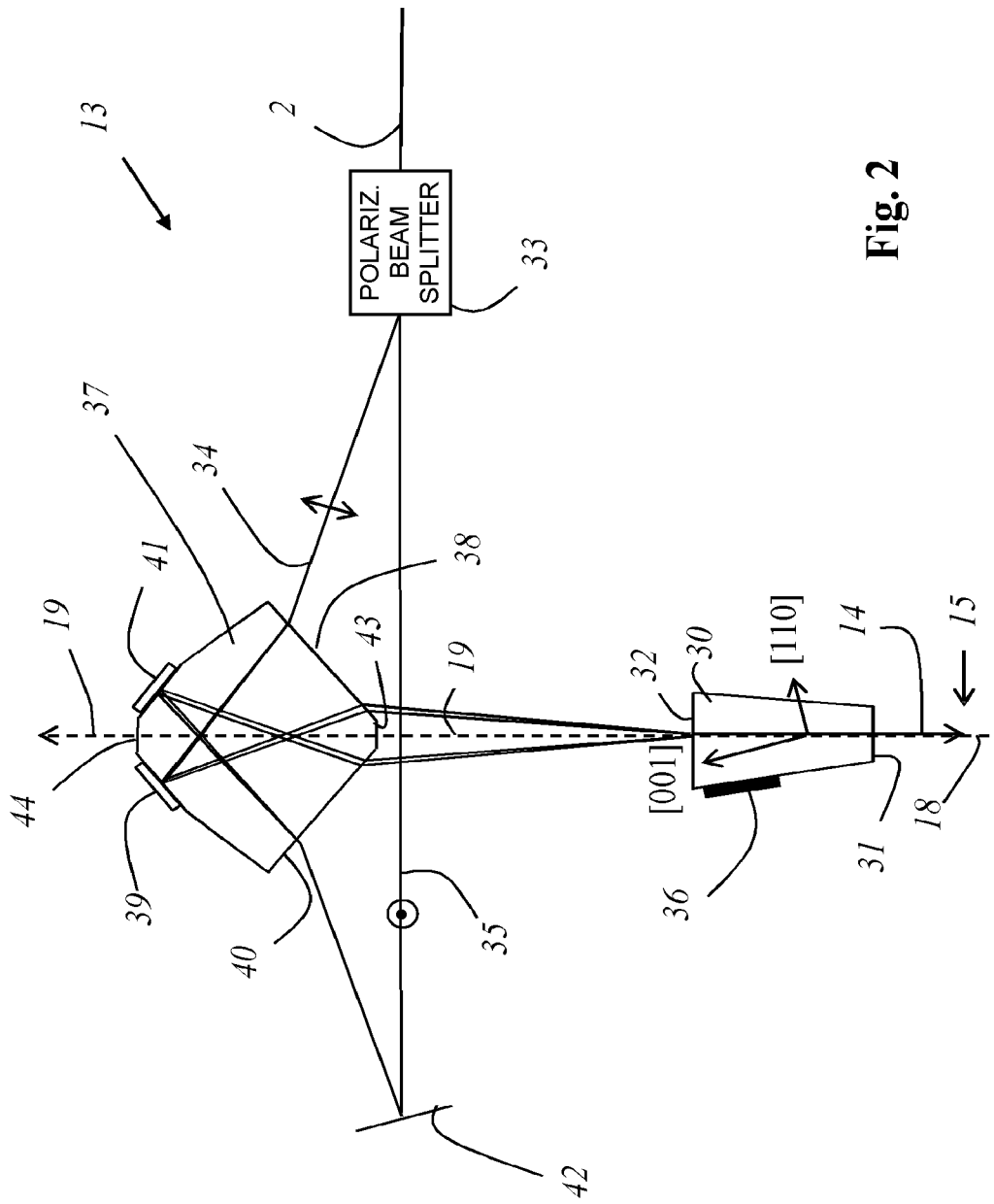
FIG. 2 shows an exemplifying embodiment of an acousto-optic apparatus of a microscope according to the present invention.

FIG. 2 schematically shows an exemplifying embodiment of an acousto-optic apparatus 13 of a microscope according to the present invention, which can function as a main beam splitter.

Acousto-optic apparatus 13 contains a polarizing beam splitter 33 that receives unpolarized primary light having multiple wavelengths, in particular unpolarized broad-band primary light 2, for example of a white light source. Polarizing beam splitter 33 spatially divides primary light 2 into a first primary light bundle 34 and a second primary light bundle 35, the light of primary light bundles 34, 35 having mutually perpendicular linear polarization directions.

Acousto-optic apparatus 13 contains a crystal 30 having an entrance surface 31 for detected light bundle 18 (drawn with dashed lines) coming from a sample (not detected here) and having an exit surface 32 for remaining portion 19 of detected light bundle 18, which is ultimately directed to a detector (not illustrated here). Exit surface 32 for remaining portion 19 is at the same time the entrance surface for coupling first primary light bundle 34 and second primary light bundle 35 into crystal 30.

Arranged on crystal 30 is a piezo acoustic generator 36 that is impinged upon by an electromagnetic high-frequency wave having one frequency or by multiple electromagnetic high-frequency waves having multiple frequencies, in order to respectively generate a mechanical wave or multiple different mechanical waves. With the aid of the mechanical wave or multiple mechanical waves, the light portions having a desired illuminating light wavelength or the light portions having multiple desired illuminating light wavelengths can be respectively deflected by diffraction both out of first primary light bundle 34 and out of second primary light bundle 35, and thus directed collinearly into an illumination beam path 15, one of the illuminating light wavelengths being respectively associated (simultaneously for both linear polarization directions) with one frequency of the respective mechanical wave (in particular in order to satisfy the respective Bragg condition).

Illuminating light 14 leaves crystal 30 through entrance surface 31 for detected light bundle 18, which is thus simultaneously the exit surface for illuminating light 14.

At the same time, that light portion which has the wavelength or wavelengths of illuminating light 14 is removed from detected light bundle 18 (drawn with dashed lines) with the aid of the mechanical wave or waves, crystal 30 and the propagation direction of the mechanical wave(s) being oriented, with respect to detected light bundle 18 coming from sample 16, in such a way that each of the mechanical waves deflects both the portion of detected light bundle 18 having the illuminating wavelength and a first linear polarization direction, and the portion of detected light bundle 18 having the illuminating wavelength and a second linear polarization direction perpendicular to the first polarization direction, and thereby removes them from detected light bundle 18. Remaining portion 19 of detected light bundle 18 leaves the crystal collinearly through exit surface 32. In the Figure, the orientation of the crystal structure is schematically indicated by labeling with the crystal axes [001] and [110].

First primary light bundle 34 is coupled into crystal 30 oppositely to the direction of the first diffraction order of the ordinary light (with respect to the diffracted portion of the detected light), while second primary light bundle 35 is coupled into crystal 30 oppositely to the direction of the first diffraction order of the extraordinary light (with respect to the diffracted portion of the detected light). All of the primary light 2 is thus available so that from that primary light 2, illuminating light 14 having a specific wavelength or specific wavelengths can be directed with the aid of the acousto-optic apparatus into the illuminating light beam path of the microscope and thus to the sample, only a single mechanical wave having a single frequency being necessary for each wavelength.

In order to achieve collinearity of illuminating light bundle 14 emerging from crystal 30, crystal 30 is preceded by a dispersive optical component 37 that spatially spectrally divides first primary light bundle 34 and second primary light bundle 35, the degree of spatial division being defined (in particular by selection of the angles and/or of the optical path lengths) so that it is undone again by crystal 30.

Dispersive optical component 37 comprises an incoupling and outcoupling window 38 for first primary light bundle 34. First primary light bundle 34 firstly enters dispersive optical component 37 through incoupling and outcoupling window 38, and after passing through dispersive optical component 37 is reflected by a first mirror 39 that is mounted on a surface located oppositely from incoupling and outcoupling window 38, before first primary light bundle 34, having been spatially and spectrally divided, leaves dispersive optical component 37 again through incoupling and outcoupling window 38.

Dispersive optical component 37 analogously comprises a further incoupling and outcoupling window 40 for second primary light bundle 35 deflected by a deflection mirror 42. Second primary light bundle 35 firstly enters dispersive optical component 37 through further incoupling and outcoupling window 40, and after passing through dispersive optical component 37 is reflected by a second mirror 41 that is mounted on a surface located oppositely from further incoupling and outcoupling window 40, before second primary light bundle 35, having been spatially and spectrally divided, leaves dispersive optical component 37 again through further incoupling and outcoupling window 40.

Dispersive optical component 37 furthermore comprises an incoupling surface 43 and an outcoupling surface 44, parallel thereto, for remaining portion 19 of detected light bundle 18. Remaining portion 19 of detected light bundle 18 passes orthogonally both through incoupling surface 43 and through the parallel outcoupling surface 44, and therefore experiences no spectral division.

The invention has been described with reference to a particular embodiment. It is self-evident, however, that modifications and variations can be carried out without thereby departing from the range of protection of the claims hereinafter.

The invention claimed is:

1. A microscope having an acousto-optic apparatus that, with a mechanical wave that is characterized by an adjustable frequency, removes from a polychromatic and collinear detected light bundle portions of illuminating light, scattered and reflected at a sample, having an illuminating light wavelength associated with the frequency,
wherein a crystal of the acousto-optic apparatus in which the mechanical wave propagates, and a propagation direction of the mechanical wave, are oriented relative to one another and relative to the detected light bundle incident into the crystal in such a way that the acousto-optic apparatus deflects, with the mechanical wave, both a first portion of the detected light bundle having the illuminating wavelength and a first linear polarization direction, and a second portion of the detected light bundle having the illuminating wavelength and a second linear polarization direction perpendicular to the first linear polarization direction, and thereby removes the first portion and the second portion from the detected light bundle.

2. The microscope according to claim 1, wherein
   a. the first linear polarization direction is the linear polarization direction of an ordinary light with respect to a birefringence property of the crystal; or
   b. the second linear polarization direction is the linear polarization direction of an extraordinary light with respect to a birefringence property of the crystal; or
   c. the first or the second linear polarization direction is arranged in the plane that is spanned by the propagation direction of the mechanical wave and the propagation direction of the detected light bundle.

3. The microscope according to claim 1, wherein a remaining portion of the detected light bundle leaves the crystal collinearly.

4. The microscope according to claim 1, wherein with the mechanical wave, the acousto-optic apparatus divides off, from at least one polychromatic and collinear primary light bundle of at least one light source, illuminating light having an illuminating light wavelength associated with the frequency of the mechanical wave, and directs the divided off illuminating light into an illumination beam path for illumination of the sample.

5. The microscope according to claim 1, wherein with the mechanical wave, the acousto-optic apparatus respectively divides off, both from a first polychromatic and collinear primary light bundle of at least one light source having a first linear polarization direction, and from a second polychromatic and preferably collinear primary light bundle of at least one light source having a second linear polarization direction different from the first linear polarization direction, illuminating light having the illuminating light wavelength associated with the frequency of the mechanical wave, and directs the divided off illuminating light into an illumination beam path for illumination of the sample.

6. The microscope according to claim 1, wherein the acousto-optic apparatus is operable to generate multiple mechanical waves characterized by different respective frequencies to remove, from the detected light bundle, illuminating light having multiple wavelengths respectively associated with the different respective frequencies of the multiple mechanical waves; and wherein for each one of the multiple wavelengths:
   a first portion of the detected light bundle having a first linear polarization direction and a second portion of the detected light bundle having a second linear polarization direction perpendicular to the first linear polarization direction are both deflected by the mechanical wave whose frequency is associated with such one of the multiple wavelengths, thereby removing the first portion and the second portion from the detected light bundle.

7. The microscope according to claim 6, wherein the multiple mechanical waves have the same propagation direction or are generated by a single acoustic generator.

8. The microscope according to claim 6, wherein with the multiple mechanical waves the acousto-optic apparatus divides off, from polychromatic primary light of at least one light source, illuminating light having multiple illuminating light wavelengths and directs the divided off illuminating light into an illumination beam path for illumination of the sample.

9. The microscope according to claim 6, wherein with the multiple mechanical waves the acousto-optic apparatus divides off, from a polychromatic and collinear primary light bundle, illuminating light of multiple illuminating light wavelengths for illumination of the sample, and directs the divided off illuminating light into an illumination beam path for illumination of the sample.

10. The microscope according to claim 6, wherein with the multiple mechanical waves, the acousto-optic apparatus respectively divides off, both from a first polychromatic and collinear primary light bundle of at least one light source having a first linear polarization direction, and from a second polychromatic and collinear primary light bundle of at least one light source having a second linear polarization direction perpendicular to the first linear polarization direction, illuminating light having several wavelengths and directs the divided off illuminating light into an illumination beam path for illumination of the sample, the frequency of the respective mechanical wave being respectively associated with one of the illuminating light wavelengths.

11. The microscope according to claim 4, wherein
   a. a first primary light bundle and a second primary light bundle have different polarization directions; or
   b. a first primary light bundle and a second primary light bundle have been produced by spatial division of a primary light bundle; or
   c. a first primary light bundle and a second light bundle have been produced by spatial division of a primary light bundle, using a polarizing beam splitter; or
   d. a first primary light bundle and a second primary light bundle have been produced by spatial division of an unpolarized primary light bundle, using a polarizing beam splitter.

12. The microscope according to claim 4, wherein the divided-off illuminating light leaves the acousto-optic apparatus or the crystal as a collinear illuminating light bundle.

13. The microscope according to claim 1, wherein
   a. the crystal comprises an entrance surface for the detected light bundle; or
   b. the crystal comprises an entrance surface for the detected light bundle through which the detected light bundle is incident at an incidence angle of zero degrees; or
   c. the crystal comprises an exit surface for the detected light bundle; or
   d. the crystal comprises an exit surface for the detected light bundle through which the detected light bundle leaves the crystal at a return angle of zero degrees; or
   e. the crystal comprises an entrance surface and an exit surface, oriented parallel thereto, for the detected light bundle.

14. The microscope according to claim 1, wherein
   a. the crystal comprises at least one entrance surface for a primary light of at least one light source; or
   b. the crystal comprises at least one entrance surface for a primary light of at least one light source, which at the same time is an exit surface for the detected light bundle; or
   c. the crystal comprises an exit surface for the illuminating light which at the same time is an entrance surface for the detected light bundle; or
   d. the crystal comprises an entrance surface for a primary light of at least one light source and an exit surface for the divided-off illuminating light, which are oriented with respect to one another in such a way that the illuminating light deflected with the mechanical wave encounters the exit surface at an incidence angle of zero degrees; or
   e. the crystal comprises an entrance surface for a primary light of at least one light source and an exit surface for the divided-off illuminating light, which are oriented with respect to one another in such a way that the primary light is couplable into the crystal as a collinear primary light bundle, and the illuminating light deflected with the mechanical wave leaves the crystal as a collinear illuminating light bundle.

15. The microscope according to claim 1, wherein
   a. the acousto-optic apparatus comprises at least one dispersive optical component that compensates for a spatial color division, produced at least in part by the crystal, of at least one of a primary light and of the illuminating light and of the detected light bundle; or
   b. the acousto-optic apparatus comprises at least one dispersive optical component that compensates for a spatial color division, produced at least in part by the crystal, of at least one of a primary light and of the illuminating light and of the detected light bundle, and that has multiple entrance surfaces; or
   c. the acousto-optic apparatus comprises at least one dispersive optical component that compensates for a spatial color division, produced at least in part by the crystal, of at least one of a primary light and of the illuminating light and of the detected light bundle, and that has a first entrance surface for light having a first linear polarization direction and a second entrance surface for light having a second linear polarization direction perpendicular to the first linear polarization direction.

16. The microscope according to claim 1, wherein the microscope is a scanning microscope or a confocal scanning microscope.

17. An acousto-optic apparatus or an acousto-optic main beam splitter for the microscope according to claim 1.

* * * * *